United States Patent [19]

Rediker et al.

[11] Patent Number: 4,798,437

[45] Date of Patent: Jan. 17, 1989

[54] METHOD AND APPARATUS FOR PROCESSING ANALOG OPTICAL WAVE SIGNALS

[75] Inventors: Robert H. Rediker, Watertown; Frederick J. Leonberger, Lexington; Darryl P. Greenwood, Westford, all of Mass.

[73] Assignee: Massachusetts Institute of Technology, Cambridge, Mass.

[21] Appl. No.: 906,593

[22] Filed: Sep. 9, 1986

Related U.S. Application Data

[63] Continuation of Ser. No. 600,028, Apr. 13, 1984, abandoned.

[51] Int. Cl.$^4$ ............................................... G02F 1/01
[52] U.S. Cl. .................................. 350/96.14; 350/320; 350/355; 350/409; 354/163; 354/403; 356/4; 356/123
[58] Field of Search ............... 350/96.11, 96.12, 96.13, 350/96.14, 320, 355, 409; 354/162, 163, 400, 402, 403; 356/3, 4, 123, 124, 124.5, 125; 364/807

[56] References Cited

U.S. PATENT DOCUMENTS

| | | | |
|---|---|---|---|
| 3,841,733 | 10/1974 | Ebersole | 350/96.14 |
| 3,920,314 | 11/1975 | Yajima | 350/96.12 |
| 3,957,340 | 5/1976 | Giallorenzi | 350/96.14 |
| 4,003,632 | 1/1977 | Komiya et al. | 350/96.14 |
| 4,041,505 | 8/1977 | Hartmann | 356/3 X |
| 4,070,094 | 1/1978 | Martin | 350/96.14 |
| 4,094,606 | 6/1978 | Camphausen | 355/3 R |
| 4,128,300 | 12/1978 | Stotts et al. | 350/96.14 |
| 4,147,979 | 4/1979 | Baues et al. | 324/244 |
| 4,266,850 | 5/1981 | Burns | 350/96.14 |
| 4,285,569 | 8/1981 | Yao et al. | 350/96.14 |
| 4,300,814 | 11/1981 | Carenco | 350/96.12 |
| 4,364,633 | 12/1982 | Verber et al. | 350/96.14 |
| 4,462,658 | 7/1984 | Scifres et al. | 350/96.14 |

FOREIGN PATENT DOCUMENTS

| | | | |
|---|---|---|---|
| 0017571 | 10/1980 | European Pat. Off. | 350/96.14 |
| 0077188 | 4/1983 | European Pat. Off. | 350/96.14 |
| 57-66417 | 4/1982 | Japan | 350/96.14 |

OTHER PUBLICATIONS

Takizawa, "Fresnel Light Modulator with An Array of Channel Waveguides", Optics Commun., vol. 37, No. 5, Jun. 1981, pp. 345-348.

Takizawa, "Electrooptic Fresnel Lens-Scanner with an Array of Channel Waveguides", Applied Optics, vol. 22, No. 16, Aug. 1983, pp. 2468-2473.

R. H. Rediker et al., Integrated Optics Wave Front Measurement Sensor, Appl. Phys. Lett., 42(8): 647-649 (15 Apr. 1983).

Jeff Hecht, Adaptive Optics Correct Laser Beams, High Technology, 12-15, (Sep. 1984).

C. M. Verber and R. P. Kenan, "Integrated Optical Circuit for Performing Vector Subtraction," SPIE, vol. 218, Devices and Systems for Optical Signal Processing (1980), pp. 23-26.

Primary Examiner—John D. Lee
Attorney, Agent, or Firm—Hamilton, Brook, Smith & Reynolds

[57] ABSTRACT

Discrete segments of an analog optical wave signal are collected in individual waveguides of a waveguide array. In the waveguide array, the optical signal is processed to provide an analysis of the signal or to control the signal. The signal can be analyzed by Mach-Zehnder interferometers which can provide an indication of the distance of a subject from the array. By controlling the dielectric constants of the waveguides electronically, the array can serve as an aberration free focusing lens or as an aberration compensation lens. Rapid electronic control of the focal length of the lens makes the lens particularly applicable to automatic focusing systems, systems which view only objects within a selected range of distances from the array, and the compiling of in focus segments to form a wide depth of field image.

30 Claims, 9 Drawing Sheets

METHOD AND APPARATUS FOR PROCESSING ANALOG OPTICAL WAVE SIGNALS

The Government has rights in this invention pursuant to Contract Number F19628-80-C-0002 awarded by the United States Air Force.

This is a continuation of co-pending application Ser. No. 600,028 filed on Apr. 13, 1984 (now abandoned).

DESCRIPTION

1. Technical Field

This invention relates to processing of analog optical signals and in particular to the analysis of optical wavefronts and the control of such wavefronts.

2. Background

Virtually any optical system, including laser systems and imaging systems such as cameras, require lenses which modify the optical wavefront to focus the light and the like. The simplest lens systems include spherical lenses which suffer aberrations such as astigmatism. To minimize the effects of those aberrations, more complex lens systems include a series of spherical lenses which together reduce the distortions. In very expensive optical systems, aspheric lenses are used to avoid the distortions. Such lens systems are both expensive and cumbersome and offer very little flexibility beyond changing the focus of the system..

DISCLOSURE OF THE INVENTION

In accordance with the present invention, discrete segments of an optical wave signal are collected individual waveguides of a waveguide array. The discrete segments are then individually or together processed within the waveguides. Mach-Zehnder interferometers combining adjacent segments can provide passive analysis of the wave front. Voltages applied to control electrodes associated with individual waveguide segments can provide amplitude or phase control of the segments and thus correct for aberrations or control focusing of the optical signal. Because the phase delays in the individual segments can be rapidly controlled, a lens formed of electronically controlled waveguide segments is particularly suited to auto-focusing techniques in photography. Further, an image can be compiled from a sequence of properly focused images to provide a wide depth of field. Also, background and foreground objects which are not in the plane of interest can be separated from the detected image of a subject.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
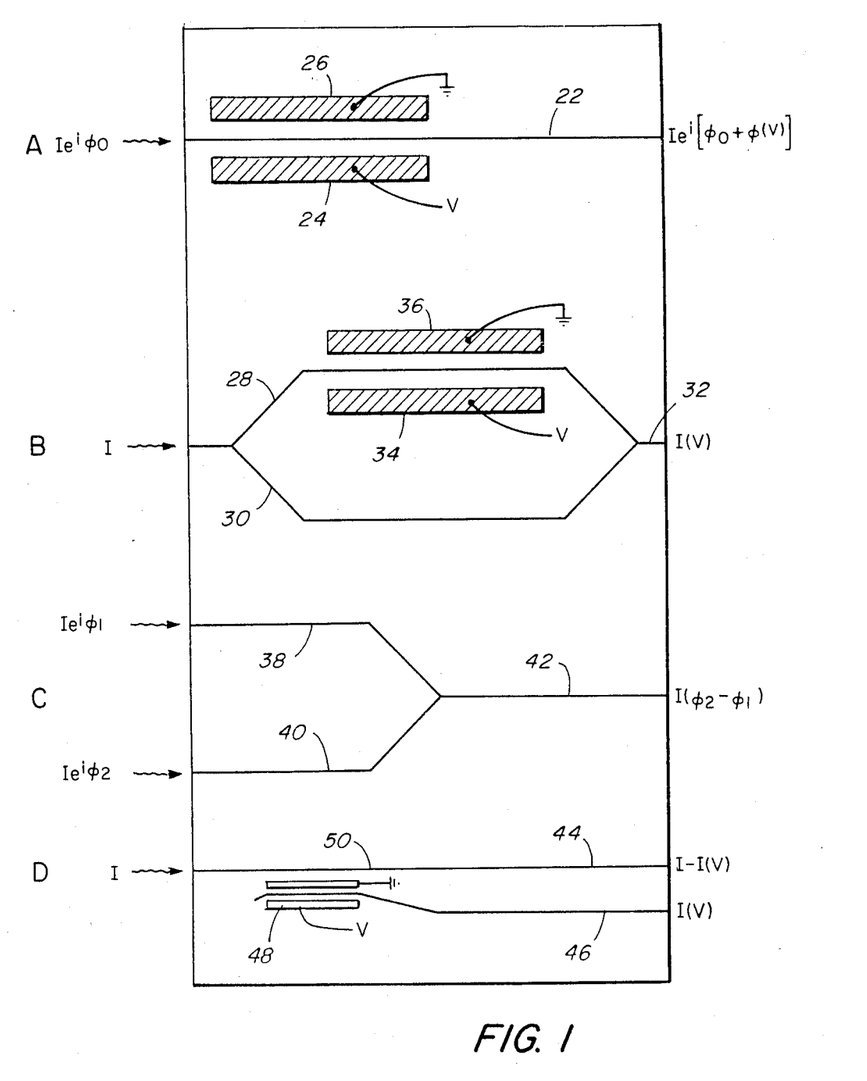
FIG. 1 illustrates individual waveguide components for use in systems embodying the present invention.

FIG. 1 shows four basic waveguide components used in various embodiments of this invention. The diffused dielectric waveguide components are in electrooptic material and are composed of singlemode waveguides whose phase velocities can be varied by varying the electric fields across the guides. A variety of electrooptic dielectric waveguides have been fabricated. Materials employed include titaniumindiffused $LiNbO_3$ (Ti:-$LiNbO_3$) which transmits from the visible to the near infrared (0.4–5.0 um), GaAs and its derivative GaInAsP which, with extrapolation to GaAlAs, transmits from the red to the near infrared (0.7–5 um),and CdTe which transmits from the visible to well past 10 um. Ti:-$LiTaO_3$ is another candidate material for the visible. The dimensions of single-mode waveguides are a function of the difference between the dielectric constants of the guide and its surroundings. For Ti-indiffused guides in $LiNbO_3$, typical dimensions are 3 um wide×3 um high for wavelenghts about 500 nm, and each of the dimensions scales linearly with light wavelength including infrared.

The waveguide component at the top of FIG. 1A is a phase modulator based on the fact that the refractive index of the waveguide 22, and consequently the phase velocity and the phase delay of a light wave transmitted along the waveguide, is a function of the voltage V applied across electrodes 24, 26. The second component, FIG. 1B, is an interferometric amplitude modulator. It incorporates a Mach-Zehnder interferometer having waveguide arms 28, 30 of virtually equal length. The output depends on the relative phase of the waves in the interferometer arms at the Y junction 32. The phase of the output of arm 28 can be controlled by the voltage V applied across the electrodes 34, 36; hence the output amplitude is a function of the applied voltage V. The third component in FIG. 1C is a Machzehnder interferometer to measure input phase differences between the radiation incident on its two arms 38, 40. The output power on waveguide 42 is a sinusoidal function of the phase difference between the waves applied to each arm. The fourth component in FIG. 1D is a directional coupler whose operation is based on the fact that the electromagnetic waves in dielectric waveguides extend into the substrate. The evanescent portion of these waves in the substrate can couple with the evanescent wave from another waveguide in close proximity.

The energy coupled between the waveguides 44 and 46 depends on the relative phase velocity in the respective waveguides and hence is a function of the voltage V applied across the electrodes 48, 50 associated with the waveguide 46.

In many applications to be described, the components are used with "white-light" input. The analysis will be limited to "white-light" bandwidths of 40% of the center frequency (e.g., 500 to 750 nm; 3.4 to 5.0 um, 8.0 to 12.0 um). If larger bandwidths are required, dichroic optics can be used at the input and a number of devices can be used, one for each color range. For 40%-bandwidth light, the waveguides of the components shown in FIG. 1 can be fabricated to remain single mode by means of current fabrication techniques. More sophisticated techniques, which discriminate against higher-mode operation such as used in guided structures in semiconductor layers, may make possible wider single-mode bandwidths. The interferometer-based components operate satisfactorily at 40% and even large bandwidths (assuming single-mode guides). The white-light interferometer has a maximum when the total path length difference from source to the Y combining junction is zero. Any differences in physical lengths of the interferometer arms as fabricated may be compensated by a voltage across one arm to make their optical lengths identical.

ARRAYS FOR MEASURING AMPLITUDE AND PHASE PROFILE

Figure 2:
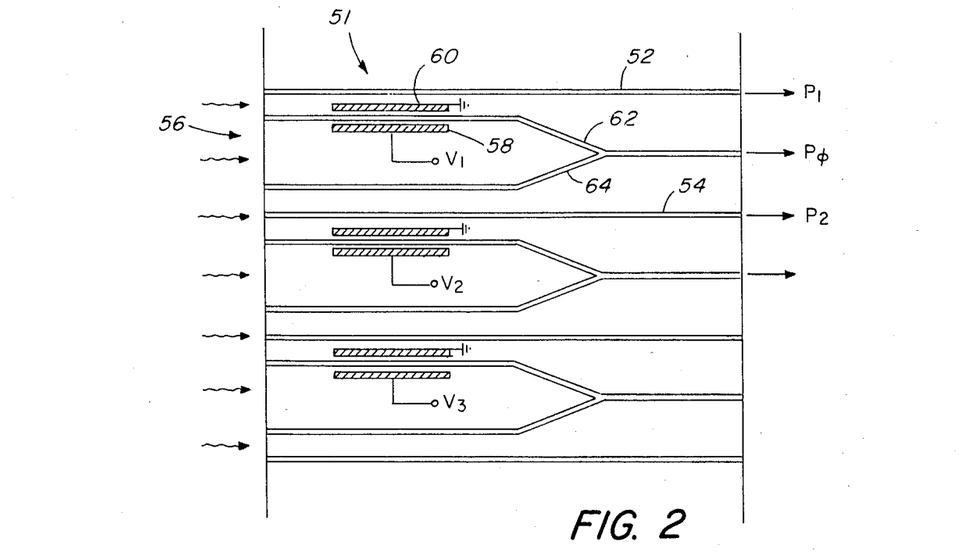
FIG. 2 illustrates a wave analyzer including an array of interferometers.

FIG. 2 shows an array of alternating straight waveguides such as waveguides 52 and 54 and interferometers 56 such as the interferometer of FIG. 1C. Control electrodes 58 and 60 are provided along one arm 62 of the interferometer 56 to compensate for differences in physical lengths of the arms 62 and 64 so that the two arms are of the same optical lengths. The outputs such as $P_1$ and $P_2$ directly provide the amplitude of the incoming light across the array.

Assuming that the signal on arm 62 is identical to that on the straight waveguide 52 and that the signal on arm 64 is identical to that on the straight waveguide 54, the output $P_\phi$ is as follows:

$$P_\phi = \tfrac{1}{4}[(P_1^{\frac{1}{2}} - P_2^{\frac{1}{2}})^2 + 4P_1^{\frac{1}{2}}P_2^{\frac{1}{2}} \cos^2(\phi/2)]B \qquad (1)$$

where the factor B takes into account additional losses in the interferometer arms such as those due to bends. Where $P_1$ and $P_2$ are equal to P, the above equation reduces to:

$$P_\phi = [2P \cos^2(\phi/2)]B \qquad (2)$$

From either equation 1 or 2, the phase difference between the waves on arms 62 and 64 can be determined based on the output intensities from the straight waveguides and the combined signal from the interferometer 56.

Figure 3:
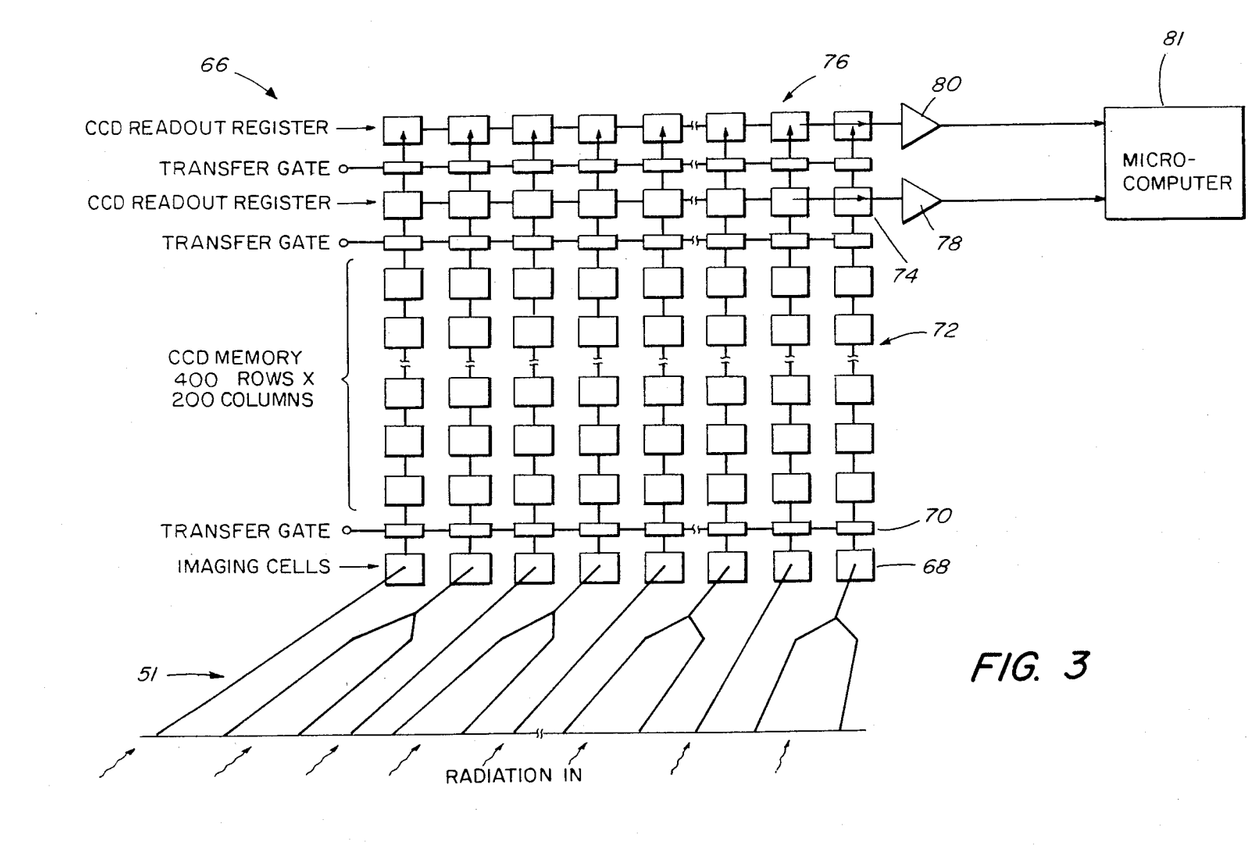
FIG. 3 illustrates the association of the array of FIG. 2 with charge couple device sensing circuitry.

FIG. 3 illustrates how the linear array 51 of FIG. 2 can be combined with a two dimensional array of charged coupled devices 66 to provide a phase and amplitude analysis across an entire aperture plane. The array 51 is mounted for scanning across the aperture. The outputs from the array are sensed by CCD imaging cells 68 which are intermittently gated through gates 70 to a CCD memory array 72. In this case, the memory array has 200 columns to correspond to 200 waveguide outputs from the array 51. Those 200 outputs define 100 pixels across a frame. The memory 72 has 400 rows of CCD devices to allow for storage of four frames, each 100 pixels tall. The outputs of the memory 72 are gated to CCD readout registers 74 and 76 to provide two serial outputs through charge detectors 78 and 80. Those outputs can be electronically processed in a microcomputer The precision in measuring the phase difference is determined by the statistical nature of the number of photoelectrons in the CCD imager. In addition, the CCD itself adds noise. Thus, it is of prime importance to maximize the photons per second transmitted by the optical waveguide components to the CCD imagers. To that end, the input beam should first be collected by a telescope and be demagnified, and the interferometer array should be ideally placed in a demagnified aperture plane of dimension equal to that of the array of interferometers. For a 10 cm diameter telescope and 500-nm-wavelength light, and for the configuration illustrated in FIG. 2 with a linear array of 100 interferometers repeated at 20-um intervals, a 50:1 demagnification system is required. As the incident wavelength is increased, the interferometer dimensions increase proportionately and the required demagnification is reduced accordingly.

Figure 4:
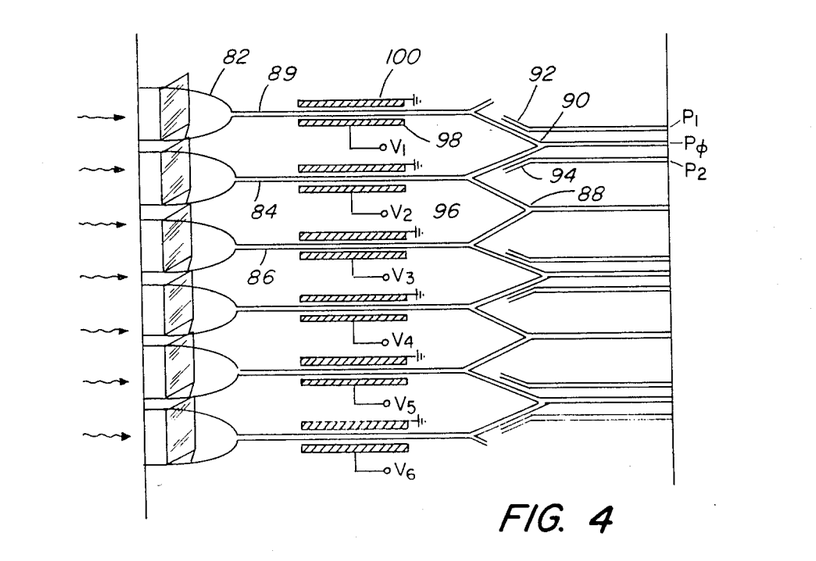
FIG. 4 illustrates an alternative wave analyzer.

FIG. 4 shows an array which may be used as an alternative to the array 51 of FIG. 2. In this configuration, a prism-horn collector 82 is provided at the input to each waveguide of the array. The collector increases the photon collection efficiency and the wavefront sampling. If a more acromatic collector were required, a tapered waveguide or a graded index lens may be more appropriate.

In the configuration of FIG. 4, input waveguides serve as arms to side-by-side interferometers. Thus, for example, waveguide 84 and waveguide 86 are the arms of an interferometer having a Y junction 88. The waveguide 84 also serves as an arm to an adjacent interferometer with waveguide 89. Waveguides 84 and 89 have a Y junction 90. The junctions such as junction 96 equally divide the photons from each arm 84 toward the respective Y junctions 88 and 90. As in previous embodiments, the electrodes 98 and 100 allow for equalization of the optical lengths of the interferometer arms despite slight differences in the physical lengths of the arms.

To obtain intensity signals P1 and P2 provided by the straight guides in the previous embodiment, directional couplers 92 and 94 are provided to tap off photons to measure the intensity in the respective arms 89 and 84.

A primary application of the system of FIG. 3 is to test laser beams. However, beyond providing an analysis of the incoming waveform, the amplitude and phase signals obtained by the system of FIG. 3 can be utilized for generating an image. A Fourier transform can be generated electronically and sophisticated processing can be performed on that Fourier transform to generate an improved image. For example, the sensed wavefront could be used as an input for spectral estimation techniques, such as maximum entropy techniques, to yield an image with the better resolution of a larger aperture. Alternatively, the system could be used to adaptively steer nulls to reduce interference to very bright objects in the image formation process.

Figure 5:
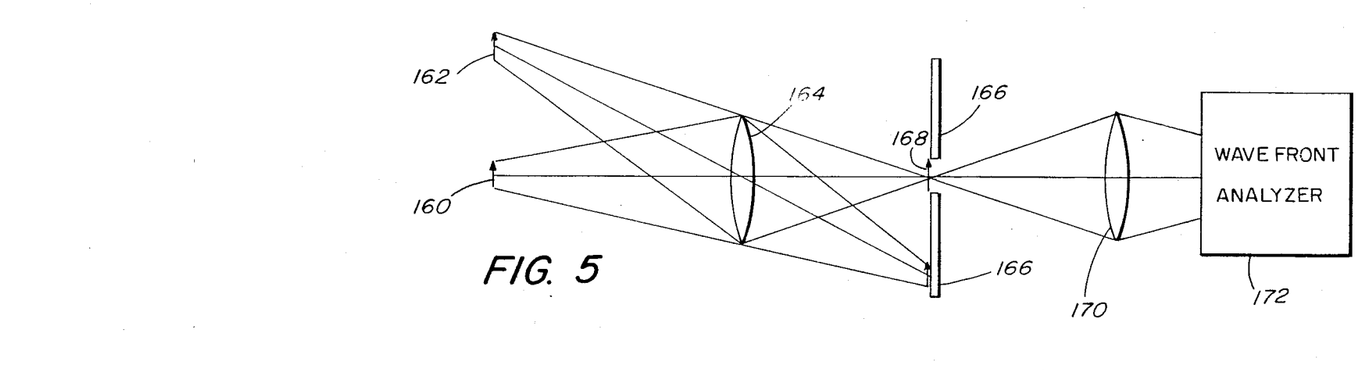
FIG. 5 illustrates a passive ranging device utilizing the analyzer of FIG. 3.

FIG. 5 illustrates a further application of the wavefront analyzer of FIG. 3. The analyzer is used to passively determine the range of an object. It is based on the recognition that the curvature of a wavefront from a point source is dependent on the distance of the wavefront from the point source. The wavefront is curved about a radius equal to the distance to the point source. So long as the analyzer of FIG. 3 only receives the light from a point source, the curvature of the wavefront can be determined from the phase differences across the wavefront. A greater curvature of the wavefront is indicated by greater phase shifts between individual segments in adjacent waveguides.

FIG. 5 illustrates a system in which the wavefront analyzer only receives the light from a small source 160, and light from a source 162 is excluded. A lens 164 focuses the objects onto an image plane at an aperture stop 166. The aperture stop 166 passes the image of the object 160 but stops the image from the object 162. Light from the image 168 is then incident on a lens 170 and directed onto a wavefront analyzer 172 of the type shown in FIG. 3.

PHASE CONJUGATE SYSTEM FOR COMPENSATED IMAGING

Figure 6:
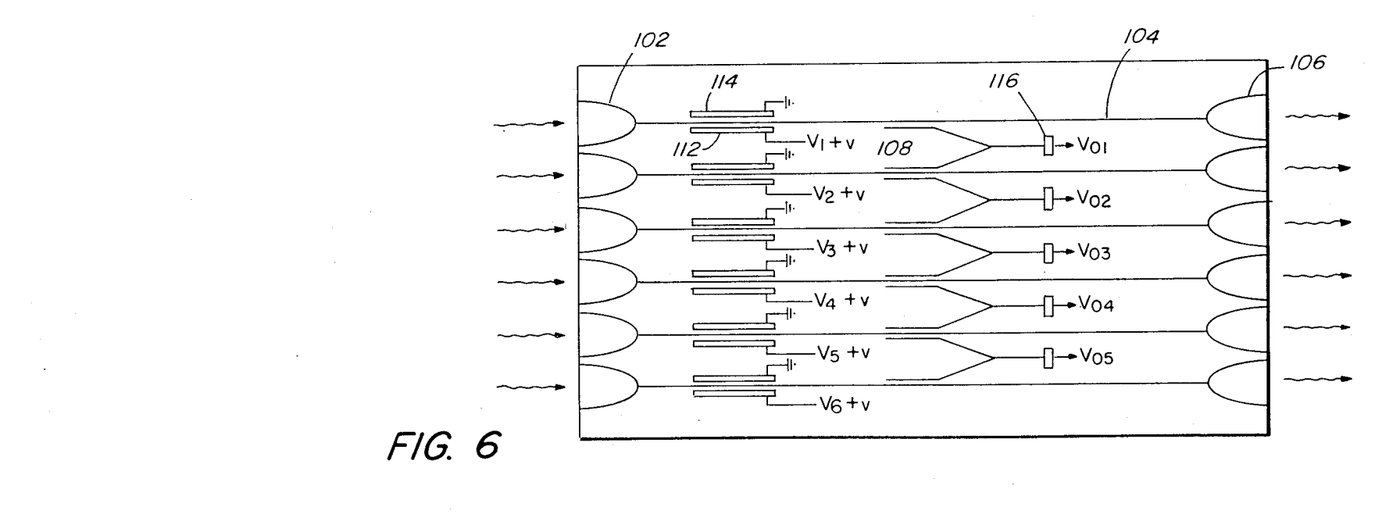
FIG. 6 illustrates an alternative embodiment of the invention which provides for phase conjugate compensation of a light wave.

FIG. 6 illustrates a system of phase conjugate compensated imaging for conversion of a wavefront of received light to a plane or spherical front. It may be used, for example, to correct distortions in a laser beam or distortions resulting from an imperfect lens.

A lightwave with aberrations is collected by an array of parabolic collectors 102 and that light is directed along straight waveguides 104 and retransmitted by parabolic transmitters 106. Directional couplers 108 collect some of the photons from adjacent straight waveguides and apply them to interferometer Y junctions 110.

When all of the signals on the straight waveguides are in phase, the interferometer outputs as measured by detectors 116 to provide voltages $V_{01}$ to $V_{0n}$, are at their maximum. To bring those signals to their maximum values, the phases of the signals on the straight waveguides 104 can be controlled by electrodes 112 and 114 associated with each waveguide. Thus, the interferometer outputs can be detected and electronically fed back through a servocontrol to control the voltages on the electrodes 112 and thus bring the signals on all waveguides into proper phase relationship. The wavefront transmitted by the transmitters 106 is thus the wavefront received by the collectors 102, compensated for phase aberrations such as those due to atmospheric effects.

In one form of servocontrol, the voltages $V_1$ to $V_n$ are dithered at $10^4$ hertz, for example. That is, very small changes in voltage v are provided at the control electrodes at the dither frequency. The servocontrol monitors the output of each interferometer at the dither frequency and determines whether a high or low dither signal results in an increase in the interferometer output. If, for example, a high dither increases the interferometer output, the phase compensating voltage would be increased. The compensating voltage continues to be increased until the servo-circuit determines that the interferometer output remains substantially constant at the dither frequency. This is referred to as a hill-climbing servo.

Because the amplitude of the dither signals is significantly lower than the amplitude of the phase compensating signals, the dither signals are generally not noticable in the output light signal. However, it can be eliminated by discontinuing the dither after the voltages applied to the phase compensating electrodes 112 are set or by additional electrodes having out-of-phase dithers positioned to the right of the interferometers of FIG. 6.

MULTI-DITHER SYSTEM FOR COMPENSATED IMAGING

Figure 7:
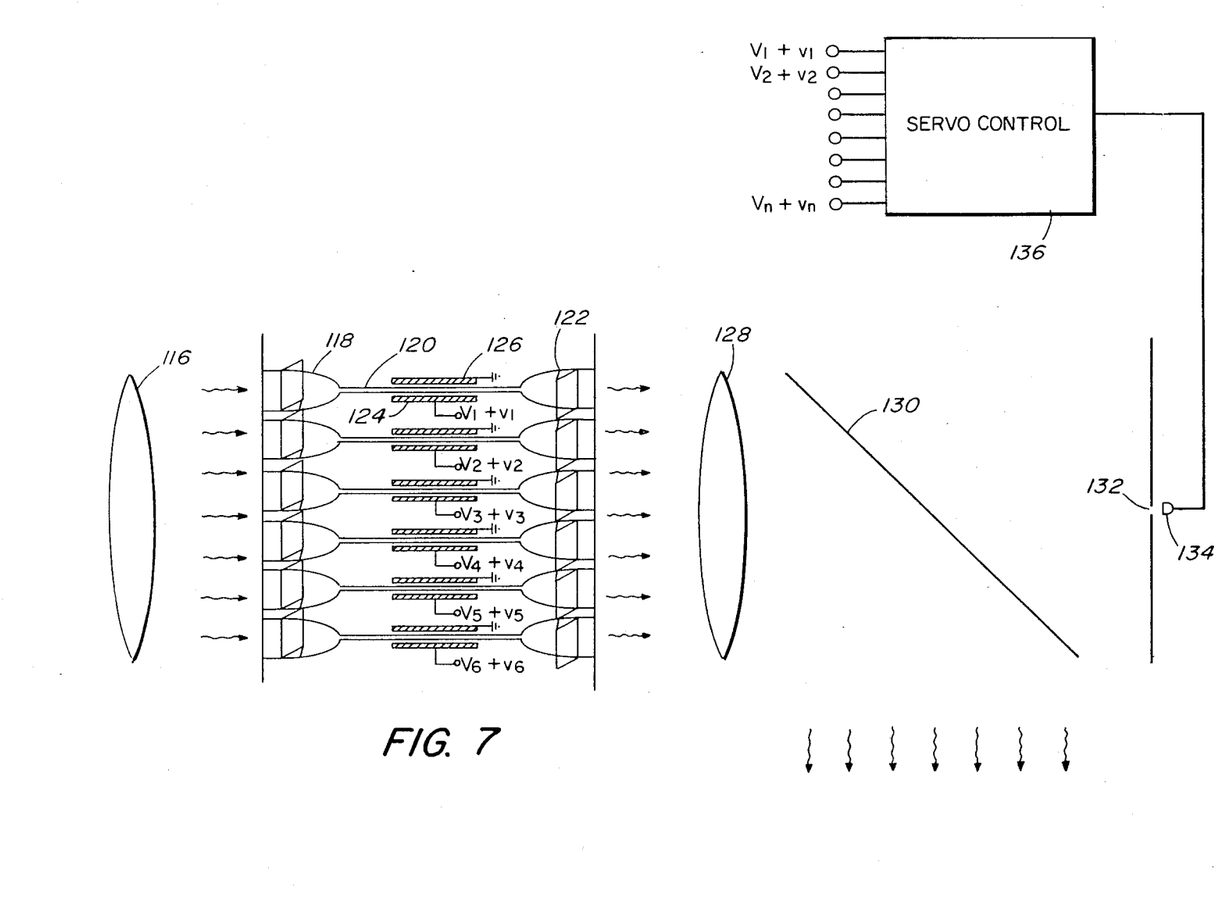
FIG. 7 illustrates yet another embodiment of the invention which provides for multi-dither phase compensation of a light wave.

FIG. 7 illustrates an alternative system for providing phase compensation to an input signal. In this system, light from an object is collimated by a lens 116. The collimated light, which includes aberrations, is collected by prism horn collectors 118 and transmitted through straight waveguides 120 to prism horn transmitters 122. While in the waveguide, the phase of individual segments of the optical signal are controlled by electrodes 124 and 126 associated with each waveguide. As a result, the retransmitted optical signal from the transmitters 122 is phase compensated for phase aberrations. Ths phase compensated signal is focused by a lens 128 through a beam splitter 130 and a pin hole 132 to a photodetector 134. The optical signal is also reflected by the beam splitter 130 toward an image plane.

To provide feedback control, the main phase compensating signals $V_1$ through $V_n$ are tagged with low amplitude, high frequency dither signals $v_1$ through $v_n$. Each tagging dither voltage is of a different frequency. The detected signal, applied to the servocontrol 136 is filtered in the servo-control so that the effect of each dither signal on the optical signal output can be determined. If the response of the output sensed by detector 134 indicates that the output is increased as the dither signal $v_1$ is increased, the primary phase compensating signal $V_1$ is increased. This is, again, the hill-climbing servo approach.

WAVEFRONT COMPENSATION TO OPTIMIZE LASER SYSTEM PERFORMANCE

In a laser system in which light is reflected from a target it is extremely advantageous to be able to compensate for the degradation of the quality of the beam as it propagates through the atmosphere to the target, as well as to improve the beam quality associated with the emission from the laser itself.

Figure 8:
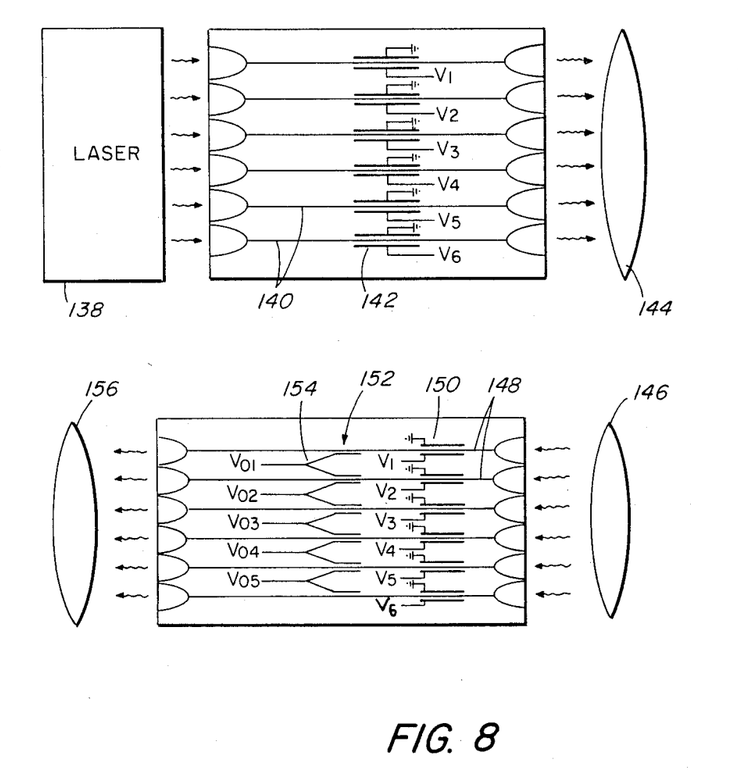
FIG. 8 illustrates yet another embodiment of the invention which provides for compensation of transmitted and received laser light to compensate for atmospheric distortions.

The system of FIG. 8 allows for phase compensating of the signal received from the target as well as the laser beam directed to the target. Light from a laser source 138 is directed through an array of waveguides 140. Each waveguide has a pair of phase compensating electrodes 142 associated with it. The phase compensated laser beam emitted by the waveguides is focused by a lens 144 on a distant target. Reflected light received back from the target is collimated by a lens 146 and the collimated beam, which includes aberrations due to the atmosphere, is directed into a receiving array of waveguides 148. Each waveguide of the array has a set of electrodes 150 associated with it for phase compensation. The beam emitted from the waveguides 148, which is phase compensated by the electrodes 150, is focused by a lens 156 onto an image plane.

As in the system of FIG. 6, directional couplers 152 take photons from the main waveguides and direct them to the Y junctions 154 of Machzehnder interferometers. The outputs $V_{01}$ through $V_{0n}$ are indicative of the phase relationship of the signals in the waveguide. The voltages $V_1$ through $V_n$ applied to the phase compensating electrodes are selected by a servocontrol to maximize the outputs $V_{01}$ to $V_{0n}$. In addition, the identical control voltages are applied to the phase compensating electrodes 142 on the transmitting waveguide array. As a result, the laser beam directed through the lens 144 has a phase which is the conjugate of the phase distortion due to the atmosphere.

In this technique for return wave atospheric compensation, the waveguide array has replaced the presently used deformable mirror. The waveguide array has an advantage over a deformable mirror system in that the voltages required to change the phase are very much lower (between 1 and 100 volts rather than kilovolts) and in that the operating frequency of the phase modulator can, if desired for any reason, be made larger than $10^9$ Hz.

PASSIVE RANGE GATE IMAGING, AUTO FOCUS AND TRACKING

Figure 9:
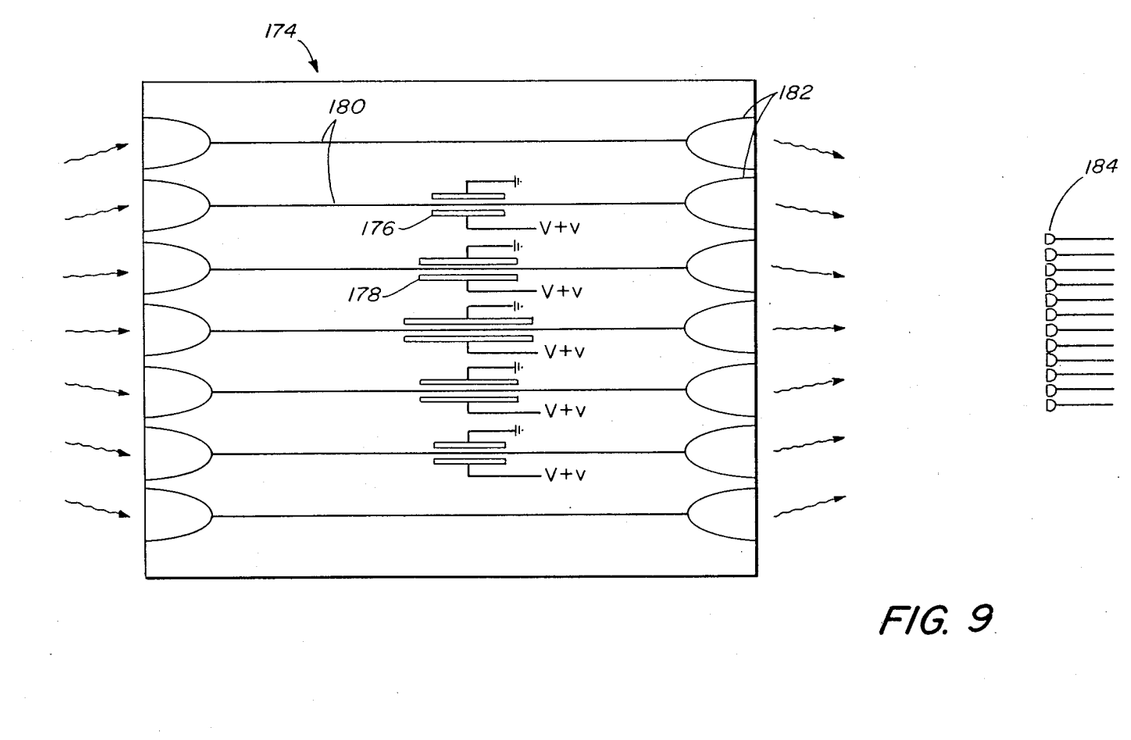
FIG. 9 illustrates a voltage controlled focusing lens embodying the present invention.

FIG. 9 illustrates an electronically controlled lens. The control electrodes, such as electrodes 176 and 178 adjacent to the straight waveguides 180 have different lengths along the waveguides. Thus, as a common voltage V is applied to each control electrode the dielectric constant in the guides is changed over differing lengths. By properly selecting the lengths of the control electrodes, the combined effect on the wavefront transmitted by the transmitter antennas 182 is that the wavefront is focused. The focus of the wavefront can be determined by the voltage applied to the control electrodes.

An array of detectors 184 is positioned at the image plane of the lens 174. The detectors might be an array of charge couple devices which provide a video signal to video electronics. Because the dielectric constants of the waveguides can be varied by the electric fields at high speeds, the system of FIG. 9 allows for very rapid automatic focusing of an image on the detectors 184. The detected signals can, for example, be applied to conventional focus detecting circuitry which determines the in focus position of a lens based on the contrast of the image. The focus can be varied by varying the control voltage V until an image of maximum contrast is obtained.

A further aspect of the system of FIG. 9 is that objects which are not in focus can be completely removed from the final image. For example, images of fog between the camera and the subject can be removed. To that end, the voltages applied to the focusing electrodes are dithered by a high frequency signal v. The dither frequency may, for example, be between $10^3$ and $10^4$ hertz. With that high dither frequency applied to the control electrodes along with the focusing voltage, the subject which is imaged onto the detectors 184 is moved rapidly in and out of focus. Only objects going through focus at the image plane will exhibit a large contrast change at that frequency as they are dithered in and out of focus. Images which are not in the image plane remain out of focus and can be considered a dc background component of the received signal. By tuning the detectors to the dithering frequency, the detectors synchronously detect only the signal at the dither frequency. The electronics can then create the in-focus image from the detected signal. Such an imaging process drastically reduces background and eliminates the detection of scattered light between the target and the detector.

Dithering through focus at $10^4$ Hz, in conjunction with appropriate servos to vary the focusing voltage V, also allows a selected target in the image plane to be tracked in focus. Also, the target velocity towards the system can be determined. In addition, tilt can be swept and dithered to keep a target on a detector in the image plane.

COMPLEX LENS, WIDE DEPTH OF FIELD CAMERA

Figure 10:
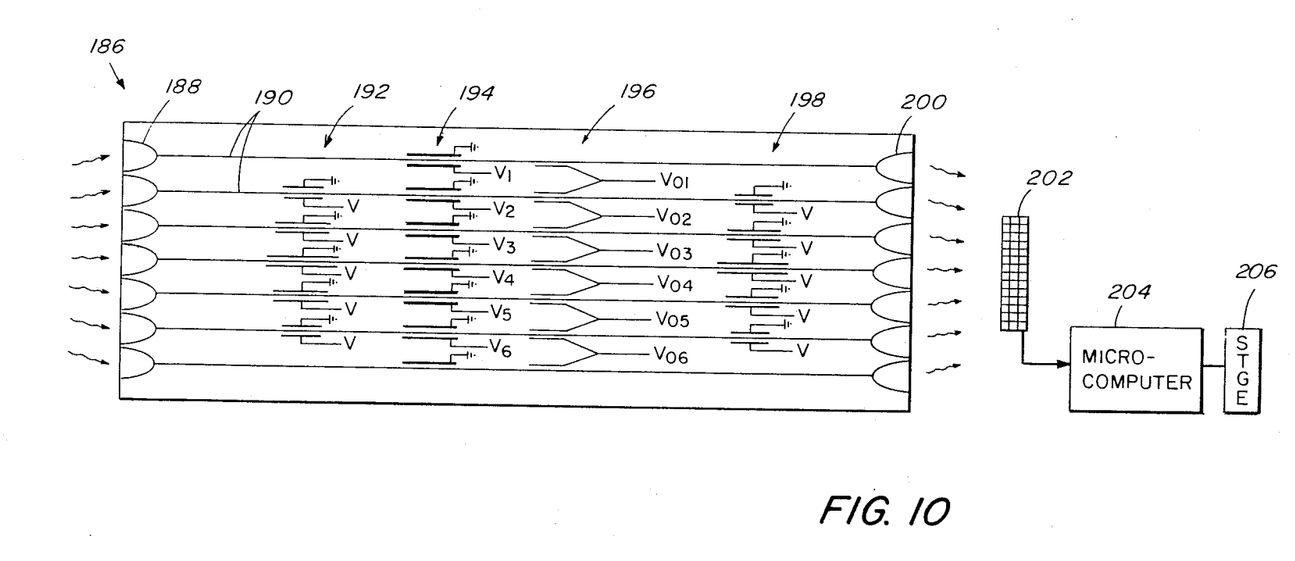
FIG. 10 illustrates a camera system incorporating electronic focusing and phase compensation.

FIG. 10 illustrates a camera system which incorporates many of the features discussed above. In conventional cameras, which utilize conventional lenses, the quality of the image depends on the complexity of the optics. Simple spherical lenses create distortions. Those distortions can be minimized by very expensive aspheric lenses. Alternatively, spherial lenses can be combined in complex lens systems to minimize the distortions. Focusing requires movement of the lens assembly by hand or by a motor. By contrast, lenses embodying the present invention are electronically controlled without movement. Further, the dielectric constant of each waveguide can be controlled independently to provide lenses which serve as very complex aspheric lenses merely by controlling the lengths of control electrodes and the voltages applied to those electrodes.

Light received by the waveguide lens assembly 186 is collected by parabolic collectors 188. The individual segments of the optical signal received by the collectors are transmitted along a two dimensional array of straight waveguides 190 past focusing electrodes 192, phase compensating electrodes 194 interferometers 196 for controlling the phase compensating electrodes and a second bank of focusing electrodes 198. The focused signal transmitted by the transmitting antennas 200 is directed to an array of charge coupled device sensors 202 at the image plane. The detected signals are applied to processing electronics which may include a microcomputer and from there signals are applied to an output device or stored in a magnetic storage device 206.

The interferometers 196 control the voltages applied to the control electrodes 194 to correct for atmospheric distortion in the same manner described above with respect to FIG. 6. This system may operate in either of two modes. In imaging small objects, the voltages applied to the control electrodes 194 are set to maximize all interferometer outputs. For extended objects, the voltages applied to the phase compensating electrodes 194 are obtained from the microcomputer 204 based on the detected image. The phase compensations are set to maximize the sharpness of the image.

The focusing electrodes 192 may operate in either of two modes. They may be set, through automatic focusing feedback from the microcomputer 204, to focus on a single subject. Alternatively, a sweep voltage V may be applied to the electrodes to cause the lens to sweep through a range of focal depths. The CCD 202 sequentially senses the images through a wide range of focuses. Those sequential images are then processed by the microcomputer 204 to select the in-focus portions of each image and provide a compiled image which is in focus over a very wide depth of field.

The very rapid response to the waveguides to the control voltages applied to the electrodes 192 allows a large number of images to be collected in a very short span of time so that the compilation can be made even from a moving subject and without regard to hand tremor of the one holding the camera.

IMAGE GENERATING DEVICE

Figure 11:
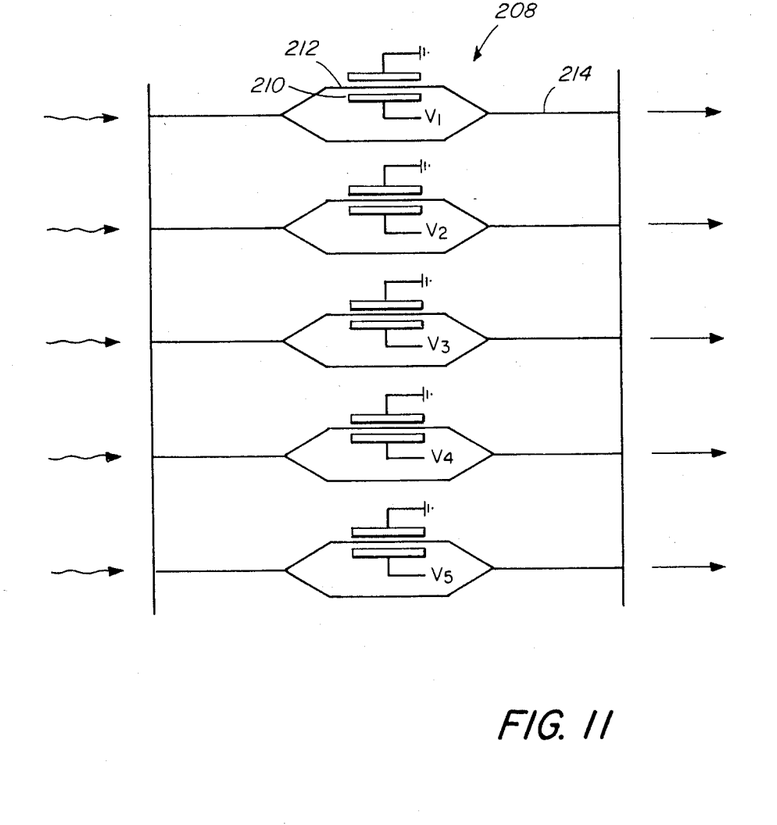
FIG. 11 illustrates yet another embodiment of the invention utilizing interferometric amplitude modulators to create an output display.

FIG. 11 illustrates an application of the interferometric amplitude modulator of FIG. 1B. In this embodiment, a two dimensional array of such amplitude modulators 208 is provided. By controlling the voltages $V_1$ through $V_n$ applied to the control electrodes 210 adjacent to the control arms 212 of the interferometers, the amplitude of light transmitted through each waveguide 214 can be controlled electronically. With a continuous beam of light applied to the input of the waveguides, the output of the waveguides may be an image determined by the electronic control.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. An analog optical wave processor comprising:
    means for collecting discrete segments of an analog optical wave in individual single-mode waveguides of a single-mode waveguide array extending across the analog optical wave;
    waveguide interferometers in which adjacent segments of the optical wave are combined to provide a wavefront analysis of the optical wave; and
    means for applying distinct electric potentials to the individual single-mode waveguides for electronically controlling the phase delays of discrete segments in individual waveguides of the array to modify the optical wave.

2. A wave processor as claimed in claim 1 wherein the means for applying electric potentials electronically controls the phase delays of the segments of the optical wave in response to the wavefront analysis to correct for aberrations in the wavefronts.

3. A wave processor as claimed in claim 1 wherein light from a source is transmitted through a transmitting waveguide array and directed to a distant subject and reflected light is collected in a second receiving waveguide array, the processor comprising waveguide interferometers in the receiving waveguide array for combining adjacent segments of the received optical wave to provide a wavefront analysis of the received optical wave and means for controlling the phase delays of individual segments of the optical wave in the transmitting array and of the optical wave in the receiving array to maximize the interferometer outputs.

4. An analog optical wave signal processor comprising:
    a light source for generating an optical wave signal;
    a transmitting waveguide array for collecting discrete segments of the optical wave signal from the light source in individual waveguides across the optical wave signal and for directing a transmitted wave signal to a distant object;
    a receiving waveguide array for collecting discrete segments of a reflected optical wave signal, reflected by the distant object, in individual waveguides extending across the reflected optical wave signal, the receiving waveguide array comprising waveguide interferometers for combining adjacent segments of the received reflected optical wave signal to provide a wavefront analysis of the received optical wave signal; and
    means for controlling the phase delays of individual segments of the optical signal in the transmitting array and of the optical signal in the receiving array to maximize the interferometer outputs.

5. An analog optical wave processor comprising:
    means for collecting discrete segments of an optical wave in individual waveguides of a waveguide array extending across the optical wave;
    means for controlling the phase delays of individual segments of the optical wave to focus the wave onto an array of detectors;
    means for dithering the phase delays of individual segments at a dithering frequency; and
    means for selecting and processing the optical waves received at the detector array at the dithering frequency such that only optical waves received from objects within a narrow range of distances from the waveguide array are processed.

6. An analog optical wave processor comprising:
    means for collecting discrete segments of an analog optical wave in individual single mode waveguides of a single mode waveguide array extending across the analog optical wave; and
    means for applying distinct electric potentials to the individual single mode waveguides for electronically controlling the phase delays of the segments of the optical wave and to correct aberrations in the optical wave.

7. Range finding apparatus comprising means for collecting discrete segments of an optical wave signal from a small object in individual waveguides of a waveguide array, waveguide interferometers for combining adjacent segments of the optical signal to provide a wavefront analysis of the optical signal and means for determining the curvature of the wavefront of the optical signal.

8. An optical lens comprising:
    means for collecting discrete segments of an analog optical wave in individual single-mode waveguides, similarly dimensioned in width and depth, of a waveguide array extending across the analog optical wave; and
    means for applying distinct electric potentials to the individual single-mode waveguides for electronically controlling the dielectric constants in individual single-mode waveguides of the array to control the phase delays of the optical wave in the individual waveguides and thereby control the focal length of the lens within a range of focal lengths.

9. An optical lens comprising:
    means for collecting discrete segments of an analog optical wave in individual single-mode waveguides of a waveguide array extending across the analog optical wave; and
    means for applying distinct electric potentials to the individual single-mode waveguides for electronically controlling the dielectric constants in individual single-mode waveguides of the array to control the phase delays of the optical wave in the individual waveguides and thereby control the focal length of the lens within a range of focal lengths.

10. A camera having a variable focus lens, the lens comprising an array of waveguides, similarly dimensioned in width and depth, for receiving an optical wave from a subject being photographed and means for electronically varying the optical lengths of the waveguides to variably focus the optical wave through a range of focal lengths.

11. A camera as claimed in claim 10 wherein the means for electronically varying the optical lengths causes the phase delay in individual waveguides to be swept through a range of phase delays corresponding to a range of focal lengths, the camera further comprising means for determining the proper focus of an image from the images received through the range of focal lengths.

12. A camera as claimed in claim 10 further comprising means for compiling individually focused images of an optical wave to provide an overall image which is in focus in substantially all segments thereof.

13. A camera having a variable focus lens, the lens comprising an arary of waveguides for receiving an optical wave from a subject being photographed and means for electronically varying the optical lengths of the waveguides to variably focus the optical wave through a range of focal lengths by causing the phase delay in individual waveguides to be swept through a range of phase delays corresponding to a range of focal lengths, the camera further comprising means for determining the proper focus of an image from the images received through the range of focal lengths.

14. A camera having a variable focus lens, the lens comprising an array of waveguides for receiving an optical wave from a subject being photographed and means for electronically varying the optical lengths of the waveguides to variably focus the optical wave through a range of focal lengths, the camera further comprising means for compiling individually focused images of an optical wave to provide an overall image which is in focus in substantially all segments thereof.

15. A method of processing an analog optical wave comprising:
    collecting discrete analog segments of the analog optical wave in individual single-mode waveguides of a waveguide array extending across the analog optical wave, the waveguides being of common dimensions; and
    variably focusing the optical wave through a range of focal lengths by electronically varying the phase delays of individual segments of the optical wave.

16. A method as claimed in claim 15 wherein the phase delays are swept through a range of phase delays corresponding to a range of focal lengths, and the proper focus for an image carrier by the analog optical wave is determined from the images received through that range of focal lengths.

17. A method as claimed in claim 15 wherein individually focused images of the optical wave are compiled to provide an overall image which is in focus at substantially all segments thereof.

18. A method of processing an analog optical wave signal comprising:
    collecting discrete segments of the optical wave signal in individual waveguides of a waveguide array extending across the optical wave signal; and
    combining adjacent segments of the analog optical signal in waveguide interferometers to determine the phase along the wavefront of the analog optical signal.

19. A method as claimed in claim 18 further comprising determining the curvature of the wavefront from a small object to determine the distance of the object.

20. A method as claimed in claim 18 further comprising electronically controlling the phase delays of the segments of the optical signal in response to the wavefront analysis to correct for aberrations in the wavefront.

21. A method as claimed in claim 18 wherein light from a source is transmitted through a transmitting waveguide array and directed to a distant subject, and light reflected from the distant subject is collected in a second receiving waveguide array as a received optical signal, the method comprising combining adjacent segments of the received optical signal in waveguide interferometers to provide a wavefront analysis of the received optical signal and electronically controlling the phase delays of individual segments of the transmitting array and the receiving array to maximize the interferometer outputs.

22. A method of processing an analog optical signal comprising:
    collecting discrete segments of the optical signal in individual waveguides of a waveguide array extending across the optical signal;
    controlling the phase delays of individual segments of the analog optical signal to focus the signal onto an array of detectors;
    dithering the phase delays of the individual segments at a dithering frequency; and
    selecting and processing the optical signals received at the detector array at the dithering frequencies such that only optical signals received from objects within a narrow range of distances are processed.

23. A method of processing an analog optical wave comprising:
    collecting discrete analog segments of the analog optical wave in individual single mode waveguides of a waveguide array extending across the analog optical wave;
    combining adjacent segments of the analog optical wave in waveguide interferometers to provide an analysis of the phase along the wavefront of the analog optical wave; and
    processing the discrete analog segments in the single mode waveguides to modify the phase along the wavefront of the analog optical wave.

24. A method as claimed in claim 23 wherein the step of processing the discrete analog segments comprises electronically controlling the phase delays of the individual segments.

25. A method as claimed in claim 23 wherein the step of processing the discrete analog segments comprises electronically controlling the phase delays of the segments of the optical wave in response to the wavefront analysis to correct aberrations in the wavefront.

26. A method of processing an analog optical wave comprising:
    collecting discrete analog segments of the analog optical wave in individual waveguides of a waveguide array extending across the analog optical wave; and
    electronically controlling the phase delays of the discrete analog segments of the optical wave to correct aberrations in the wavefront.

27. A method of processing an analog optical wave signal comprising:
    collecting discrete segments of the optical wave in individual waveguides of a waveguide array extending across the optical wave signal; and
    combining adjacent segments of the analog optical signal in waveguide interferometers to provide a wavefront analysis of the analog optical signal and determine the curvature of the wavefront from a small object to determine the distance of the object.

28. A method of processing an analog optical wave signal comprising:
    collecting discrete segments of the optical wave signal in individual waveguides of a waveguide array extending across the optical wave signal;

combining adjacent segments of the analog optical signal in waveguide interferometers to provide a wavefront analysis of the analog optical signal; and electronically controlling the phase delays of the segments of the optical signal in response to the wavefront analysis to correct for aberrations in the wavefront.

29. A method of processing an analog optical wave signal comprising:

transmitting light from a source through a transmitting waveguide array and directing the light to a distant subject;

collecting, as a received optical signal, discrete segments of an optical wave of light reflected from the distant subject in individual waveguides of a second receiving waveguide array extending across the optical wave;

combining adjacent segments of the received optical signal in waveguide interferometers to provide a wavefront analysis of the received optical signal; and electronically controlling the phase delays of individual segments of the transmitting array and the receiving array to maximize the interferometer outputs.

30. A method of processing an analog optical wave comprising:

collecting discrete analog segments of the analog optical wave in individual single mode waveguides of a waveguide array extending across the analog optical wave;

combining adjacent segments of the analog optical wave in waveguide interferometers to provide a wavefront analysis of the analog optical wave; and electronically controlling the phase delays of the segments of the optical wave in response to the wavefront of the analysis to correct aberrations in the wavefront.

* * * * *